(12) United States Patent
Kimura et al.

(10) Patent No.: US 8,860,376 B2
(45) Date of Patent: Oct. 14, 2014

(54) SEMICONDUCTOR INTEGRATED CIRCUIT DEVICE, ELECTRONIC APPARATUS, AND CHARGING CONTROLLER FOR SECONDARY BATTERY

(75) Inventors: Daisuke Kimura, Tama (JP); Koichi Yamaguchi, Tama (JP); Iwao Kitamura, Tama (KR)

(73) Assignee: Mitsumi Electric Co., Ltd., Tokyo (JP)

( * ) Notice: Subject to any disclaimer, the term of this patent is extended or adjusted under 35 U.S.C. 154(b) by 376 days.

(21) Appl. No.: 12/664,125

(22) PCT Filed: Jul. 2, 2008

(86) PCT No.: PCT/JP2008/062004
§ 371 (c)(1),
(2), (4) Date: Dec. 11, 2009

(87) PCT Pub. No.: WO2009/005097
PCT Pub. Date: Jan. 8, 2009

(65) Prior Publication Data
US 2010/0176768 A1    Jul. 15, 2010

(30) Foreign Application Priority Data
Jul. 5, 2007    (JP) .................. 2007-177465

(51) Int. Cl.
*H02J 7/04*    (2006.01)
*H01M 10/44*    (2006.01)
*H02J 7/00*    (2006.01)

(52) U.S. Cl.
CPC .......... *H01M 10/443* (2013.01); *H02J 7/0091* (2013.01); *Y02B 40/90* (2013.01); *H02J 7/047* (2013.01)

USPC .................. 320/153; 320/150; 320/152

(58) Field of Classification Search
USPC ........................ 320/150, 152, 153
See application file for complete search history.

(56) References Cited

U.S. PATENT DOCUMENTS

| 5,410,238 A | 4/1995 | Ishizuka et al. |
| 5,497,068 A * | 3/1996 | Shiojima .................. 320/150 |

(Continued)

FOREIGN PATENT DOCUMENTS

| JP | 04-340330 | 11/1992 |
| JP | 08-019192 | 1/1996 |

(Continued)

OTHER PUBLICATIONS

Korean Office Action mailed Feb. 17, 2011 with English translation.

(Continued)

*Primary Examiner* — Yalkew Fantu
*Assistant Examiner* — Manuel Hernandez
(74) *Attorney, Agent, or Firm* — IPUSA, PLLC (57) ABSTRACT

A charging control circuit for a secondary battery includes a temperature detection terminal for detecting the temperature of a secondary battery from an input detected voltage; a temperature comparison part having four threshold voltages corresponding to four reference temperatures, the temperature comparison part being configured to compare the four threshold voltages with the detected voltage input to the temperature detection terminal and to output a temperature range signal indicating the temperature range of the detected voltage; and a control part configured to control a charging current and/or a charging voltage based on the temperature range signal output from the temperature comparison part.

5 Claims, 4 Drawing Sheets

(56) References Cited

U.S. PATENT DOCUMENTS

| | | | |
|---|---|---|---|
| 5,504,416 A * | 4/1996 | Holloway et al. | 320/152 |
| 5,710,501 A * | 1/1998 | van Phuoc et al. | 307/150 |
| 5,900,717 A * | 5/1999 | Lee | 320/150 |
| 6,191,556 B1 * | 2/2001 | Galbraith et al. | 320/132 |
| 6,771,051 B2 * | 8/2004 | Oglesbee et al. | 320/150 |
| 8,183,824 B2 * | 5/2012 | Emek et al. | 320/107 |
| 2003/0090238 A1 | 5/2003 | Wolin et al. | |
| 2004/0036460 A1 * | 2/2004 | Chatal | 323/313 |
| 2004/0135552 A1 | 7/2004 | Wolin et al. | |
| 2005/0099163 A1 * | 5/2005 | Liepold | 320/150 |
| 2007/0188139 A1 * | 8/2007 | Hussain et al. | 320/128 |
| 2008/0144415 A1 * | 6/2008 | Macerola et al. | 365/211 |
| 2009/0195215 A1 * | 8/2009 | Sato et al. | 320/150 |
| 2010/0264883 A1 * | 10/2010 | Aiura | 320/150 |
| 2012/0274269 A1 * | 11/2012 | Ohkuma | 320/107 |
| 2013/0293186 A1 * | 11/2013 | Chou et al. | 320/107 |

FOREIGN PATENT DOCUMENTS

| | | |
|---|---|---|
| JP | 09-017454 | 1/1997 |
| JP | 09-289741 | 11/1997 |
| JP | 10-126976 | 5/1998 |
| JP | 2001-016795 | 1/2001 |
| JP | 2003-199262 | 7/2003 |
| JP | 2004-274871 | 9/2004 |
| JP | 2006-187185 | 7/2006 |
| JP | 2006-288150 | 10/2006 |

OTHER PUBLICATIONS

A Guide to the Safe Use of Secondary Lithium Ion Batteries in Notebook-type Personal Computers, Apr. 20, 2007, Japan Electronics and Information Technology Industries Association arid Battery Association of Japan.

Japanese Office Action mailed May 8, 2012 (Japanese Patent Application No. JP2007-177465).

Japanese Office Action mailed Sep. 4, 2012 (Japanese Patent Application No. JP2007-177465).

Japanese Office Action mailed Sep. 4, 2012 (Japanese Patent Application No. JP2012-151793).

Japanese Office Action dated Apr. 30, 2013.

* cited by examiner

SEMICONDUCTOR INTEGRATED CIRCUIT DEVICE, ELECTRONIC APPARATUS, AND CHARGING CONTROLLER FOR SECONDARY BATTERY

TECHNICAL FIELD

The present invention relates to a charging control circuit for a secondary battery and to a charging controller using the same. Particularly, the present invention relates to a charging control circuit for a secondary battery that detects the temperature of the secondary battery and controls charging current and/or charging voltage based thereon, and to a charging controller using the same.

BACKGROUND ART

Conventionally, a charging circuit is known that is connected to a constant voltage source to charge a secondary battery with the supply voltage of the constant voltage source and includes a thermistor to detect the temperature of the secondary battery as a change in resistance and a voltage detection part to detect a voltage at one end of the thermistor being lower than or equal to a predetermined low voltage, where the charging circuit stops charging the secondary battery with the supply voltage of the constant voltage power supply in response to the voltage detection part detecting the voltage being lower than or equal to the predetermined low voltage. (See, for example, Patent Document 1.)

[Patent Document 1] Japanese Laid-Open Patent Application Publication No. 2004-274871

DISCLOSURE OF THE INVENTION

Problems to be Solved by the Invention

However, according to the above-mentioned configuration described in Patent Document 1, the only possible control in response to the voltage at one end of the thermistor being lower than or equal to a predetermined constant voltage, that is, in response to detecting high temperature of the secondary battery, is to stop charging. Therefore, it is only possible to prevent overcharging or heating of the secondary battery, and it has been impossible to perform fine control according to a change in the temperature of the secondary battery.

Therefore, an object of the present invention is to provide a charging control circuit capable of performing fine control based on the temperature of a secondary battery to ensure safety at a charging time and of increasing the charging efficiency of the secondary battery by performing proper control according to a temperature range, and a charging controller using the same.

Means for Solving the Problems

In order to achieve the above-described object, a charging control circuit for a secondary battery according to a first aspect of the present invention includes a temperature detection terminal for detecting a temperature of the secondary battery from an input detected voltage; a temperature comparison part having four threshold voltages corresponding to four reference temperatures, the temperature comparison part being configured to compare the four threshold voltages with the detected voltage input to the temperature detection terminal and to output a temperature range signal indicating a temperature range of the detected voltage; and a control part configured to control at least one of a charging current and a charging voltage based on the temperature range signal output from the temperature comparison part.

As a result, by providing four reference temperatures, it is possible to control charging finely in accordance with the temperature of a secondary battery.

According to a second aspect of the present invention, in the charging control circuit for the secondary battery according to the first aspect of the present invention, the temperature comparison part includes four comparators having respective first inputs connected in parallel to the temperature detection terminal and having respective second inputs connected to a threshold voltage setting circuit formed of a voltage divider circuit.

As a result, it is possible to compare a detected voltage input to a temperature detection terminal simultaneously with four threshold voltages with a simple circuit configuration, and to perform suitable charging control according to temperature.

According to a third aspect of the present invention, the charging control circuit for the secondary battery according to the second aspect of the present invention further includes a battery voltage detection part configured to detect a terminal voltage of the secondary battery and to output a battery voltage signal indicating a voltage range of the terminal voltage, wherein the control part includes a logic part to which the battery voltage signal output from the battery voltage detection part and the temperature range signal output from the temperature comparison part are input, the logic part being configured to output a control signal based on the input signals.

As a result, it is possible to perform control that combines regular constant current control and/or constant voltage control performed based on the terminal voltage of a secondary battery and the control of the present invention based on the temperature of a secondary battery, so that it is possible to optimize the control of the charging of the secondary battery in view of the parameters of both terminal voltage and temperature of the secondary battery.

According to a fourth aspect of the present invention, in the charging control circuit for the secondary battery according to the third aspect of the present invention, the four reference temperatures are set so as to determine a predetermined high temperature range between a highest one and a second highest one of the reference temperatures, a predetermined low temperature range between a lowest one and a second lowest one of the reference temperatures, and a predetermined standard range between the second highest one and the second lowest one of the reference temperatures, and the control part is configured to perform current control so that the charging current is a predetermined small current, in response to the temperature range signal being in one of the high temperature range and the low temperature range, and to perform current control so that the charging current is a predetermined large current, in response to the temperature range signal being in the standard range.

As a result, it is possible to perform charging current control where charging is performed with a small current that imposes a smaller load on a secondary battery when the temperature of the secondary battery is in a high temperature range or a low temperature range and charging is performed with a large current when the temperature of the secondary battery is in a standard temperature range because there is no need to consider a load on the secondary battery. Thus, it is possible to perform suitable charging control that considers the load on and the efficiency of the secondary battery to the maximum.

According to a fifth aspect of the present invention, in the charging control circuit for the secondary battery according to the fourth aspect of the present invention, the control part is configured to perform current control so as to stop feeding the charging current, in response to the temperature range signal being in one of a range higher than the high temperature range and a range lower than the low temperature range.

As a result, it is possible to ensure that charging is stopped outside a temperature range where a secondary battery may be charged and to ensure prevention of the overloading of the secondary battery, thus making it possible to extend the service life of the secondary battery.

A charging controller for a secondary battery according to a sixth aspect of the present invention includes the charging control circuit for the secondary battery according to the first aspect of the present invention on a board; and a package housing the board.

This facilitates conveyance of a charging control circuit and its incorporation and installation in various electronic apparatuses, thus facilitating its mounting in electronic apparatuses.

Effects of the Invention

According to the present invention, it is possible to control charging finely in accordance with the temperature of a secondary battery and to control charging suitably in view of a load on the secondary battery and its charging efficiency.

BRIEF DESCRIPTION OF THE DRAWINGS

FIG. 3(a) is a diagram illustrating changes over time in AC adapter supply voltage. FIG. 3(b) is a diagram illustrating changes over time in the voltage of a secondary battery 81. FIG. 3(c) is a diagram illustrating changes over time in charging current. FIG. 3(d) is a diagram illustrating changes over time in the lighting pattern of an LED.

FIG. 4(a) is a diagram illustrating changes over time in the charger voltage input to a VDD1 terminal. FIG. 4(b) is a diagram illustrating changes over time in the battery voltage detected from a BAT terminal. FIG. 4(c) is a diagram illustrating changes over time in the terminal voltage of a temperature detection terminal TDET. FIG. 4(d) is a diagram illustrating changes over time in battery temperature. FIG. 4(e) is a diagram illustrating changes over time in charging current. FIG. 4(f) is a diagram illustrating changes over time in the lighting pattern of an LED.

DESCRIPTION OF THE REFERENCE NUMERALS

TDET temperature detection terminal
10 temperature comparison part
11, 12, 13, 14 comparator
15 regulator
R0, R1, R2, R3, R4, R5 resistor
20 control part
21 logic part
22 output control part
30 battery voltage detection part
40 overheating protection part
50 charging control circuit
60 board
70 package
80 battery pack
81 secondary battery
82 thermistor
90 charger
100 charging controller

BEST MODE FOR CARRYING OUT THE INVENTION

A description is given below, with reference to the drawings, of a best mode for carrying out the present invention.

Figure 1:
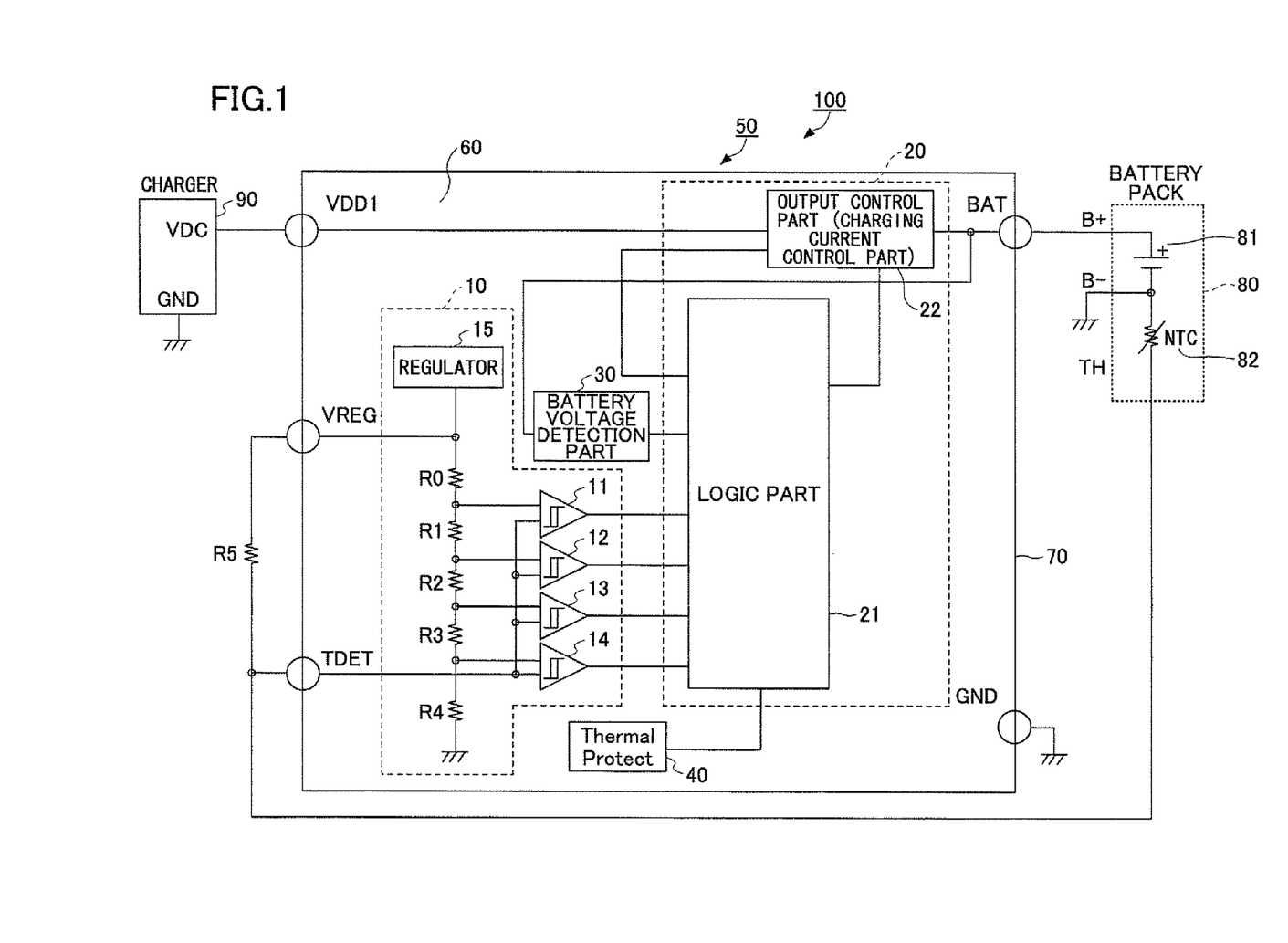
FIG. 1 is a diagram of the overall configuration of a charging control circuit 50 and a charging controller 100 using the same according to an embodiment to which the present invention is applied.

FIG. 1 is a diagram of the overall configuration of a charging control circuit 50 and a charging controller 100 using the same according to an embodiment to which the present invention is applied.

In FIG. 1, the charging control circuit 50 according to this embodiment includes a temperature detection terminal TDET, a temperature comparison part 10, and a control part 20. Further, the charging controller 100 according to this embodiment includes the charging control circuit 50 on a board 60 and further includes a package 70 that houses the board 60. The board 60 may be, for example, a semiconductor substrate. The charging controller 100 that has the board 60 housed in the package 70 may be configured as, for example, a semiconductor integrated circuit device for charging control.

The charging control circuit 50 and the charging controller 100 using the same according to this embodiment may include a VDD1 terminal, a VREG terminal, a BAT terminal, and a GND terminal. A charger 90 including an AC adapter (not graphically illustrated) is connected to the VDD1 terminal so as to feed supply voltage to the charging control circuit 50. The positive terminal of a secondary battery 81 housed in a battery pack 80 is connected to the BAT terminal so as to allow charging current to be fed from the BAT terminal to the secondary battery 81. The VREG terminal is a terminal that outputs a reference voltage to feed the reference voltage to the temperature detection terminal TDET. The GND terminal is a terminal that is grounded to provide the charging control circuit 50 with ground potential (0 V).

The temperature detection terminal TDET, which is a terminal for detecting the temperature of the secondary battery 81, is connected to a thermistor 82 connected to the negative terminal of the secondary battery 81 housed in the battery pack 80. The thermistor 82 is a temperature sensor to detect the temperature of the secondary battery 81, and its resistance varies in accordance with a change in the temperature. According to this embodiment, a description is given, by way of example, of an NTC (Negative Temperature Coefficient) thermistor having a negative temperature coefficient, whose resistance decreases with an increase in temperature. Those of other modes are also applicable. Usually, the thermistor 82 is housed in the battery pack 80, and the temperature detection terminal TDET may be connected to the thermistor 82 by connecting the temperature detection terminal TDET to a thermistor terminal TH provided in the battery pack 80.

The temperature detection terminal TDET is also connected to the VREG terminal through a resistor R5, so that the resistor R5 and the thermistor 82 form a voltage divider circuit to detect a divided voltage applied across the thermistor 82 relative to the reference voltage supplied at the VREG terminal. In the case of applying an NTC thermistor as the thermistor 82, the resistance of the thermistor 82 decreases as temperature increases, and accordingly, the detected voltage detected at the temperature detection terminal TDET also decreases. Thus, the resistance of the thermistor 82 also changes with a change in the temperature of the secondary battery 81, so that the detected voltage input to the temperature detection terminal TDET also changes. Accordingly, the temperature detection terminal TDET can detect the temperature of the secondary battery 81 based on the input detected voltage.

The temperature comparison part 10 is a circuit part that compares the detected voltage input to the temperature detection terminal TDET with threshold voltages set in correspondence to four reference temperatures and outputs signals indicating a temperature range in which the detected voltage is included.

The constituent elements of the temperature comparison part 10 are four comparators 11 through 14, a regulator 15, and resistors R0 through R4. The four comparators 11 through 14 are comparison means for comparing the detected voltage input to the temperature detection terminal TDET with the four threshold voltages. Each of the comparators 11 through 14 performs comparison with only a single threshold voltage, but it is preferable that the comparisons be performed simultaneously. Accordingly, all of one inputs of the four comparators 11 through 14 are connected in parallel to the temperature detection terminal TDET. This enables comparison with the four reference voltages at a time.

The regulator 15, which is means for causing a predetermined reference voltage to be generated, serves as a voltage source of the reference voltage output from the VREG terminal and as a voltage source for supplying the comparators 11 through 14 with the threshold voltages.

The resistors R0 through R4 are voltage divider resistors forming a voltage divider circuit for setting threshold voltages to serve as references in the comparisons performed in the comparators 11 through 14. In order for four appropriate reference temperatures to be set, threshold voltages corresponding to them are set in view of the temperature-converted value of the detected voltage input to the temperature detection terminal TDET. The reference voltage Vref applied from the regulator 15 causes a constant current I=Vref/(R0+R1+R2+R3+R4) to flow through each of the resistors R0 through R4. Accordingly, the threshold voltage of the comparator 11 is set as (R1+R2+R3+R4)·I, the threshold voltage of the comparator 12 is set as (R2+R3+R4)·I, the threshold voltage of the comparator 13 is set as (R3+R4)·I, and the threshold voltage of the comparator 14 is set as R4·I. The thermistor 82 decreases in resistance as temperature increases. At low temperature, the thermistor 82 is high in resistance and its detected voltage is large. Therefore, the threshold voltage of the comparator 11 corresponds to the lowest reference temperature, and the threshold voltage of the comparator 14 corresponds to the highest reference temperature. Likewise, the threshold voltage of the comparator 12 corresponds to the second lowest reference temperature, and the threshold voltage of the comparator 13 corresponds to the second highest reference temperature. A detailed description is given below of the setup of these four reference temperatures.

The threshold voltages of the comparators 11 through 14 set by the voltage divider circuit formed of the resistors R0 through R4 are input to the inputs of the comparators 11 through 14, respectively, to which inputs the detected voltage is not input, and serve as threshold voltages to be compared with the detected voltage. Of the detected voltage and the threshold voltage input to each of the comparators 11 through 14, one is input to an inverting input and the other is input to a non-inverting input. It may be determined according to purposes which is input to the inverting input or non-inverting input. That is, it can be determined suitably according to purposes which of a high-level signal and a low-level signal is output in response to the detected voltage exceeding the threshold voltage.

Further, each of the comparators 11 through 14 may be provided with hysteresis in order to prevent the effect of noise or the like. This makes it possible to prevent such a condition as hunting.

As a result of such processing in the temperature comparison part 10, temperature range signals indicating a temperature range in which the detected voltage is included are output, thereby making it possible to determine, in relation to the four reference temperatures, which temperature range the temperature of the secondary battery 81 is in.

The control part 20, which includes a logic part 21 and an output control part (charging current control part) 22, controls charging current and/or charging voltage based on the temperature range signals output from the comparators 11 through 14 of the temperature comparison part 10.

The logic part 21, which includes a logic circuit, outputs, based on the temperature range signals, an output instruction signal to control charging current and/or charging voltage in accordance with the detected temperature range. Such control of charging current and/or charging voltage may be performed by outputting an instruction to output a predetermined small current or large current in accordance with the temperature range. For the secondary battery 81 using lithium ions or the like, there are a temperature range where a large current may be caused to flow at the time of charging, a temperature range where a large current may not be caused to flow and only a small current may be caused to flow at the time of charging, and a temperature range where no current may be caused to flow at the time of charging, which depend on the temperature of the secondary battery 81 itself. Therefore, the logic part 21 performs control where it determines, with the logic circuit, what charging current to be caused to flow is appropriate for the input temperature range signals and outputs an output instruction to cause charging current of an appropriate level to flow.

The output control part 22, which includes a transistor device, follows the output instruction signal from the logic part 21 and outputs charging current according to this. For example, in the case of receiving an instruction to output a predetermined low current or a predetermined high current from the logic part 21, the output control part 22 outputs a constant current such as the predetermined low current or high current according to the instruction.

The logic part 21 may also be configured to be able to control charging based on not only the temperature range signals but the battery voltage of the secondary battery 81. Specifically, for example, in FIG. 1, the BAT terminal connected to the positive terminal of the secondary battery 81 is connected to a battery voltage detection part 30, so that the output signal of the battery voltage detection part 30 is input to the logic part 21. The battery voltage detection part 30 can detect the terminal voltage of the secondary battery 81 from the BAT terminal, and can detect the range of magnitude of the terminal voltage. That is, the battery voltage detection part 30 may be configured to, for example, have a threshold voltage to serve as an object of comparison set inside by a comparator the same as in the temperature comparison part 10, so as to be able to determine whether the detected battery voltage has exceeded the threshold voltage. This makes it possible to add the battery voltage of the secondary battery 81 to the target parameters of the logic circuit, and to control charging current and/or charging voltage while taking the magnitude of the battery voltage into consideration.

According to this embodiment, if the secondary battery 81 is, for example, a lithium ion battery, it is necessary to determine whether the charging current is to be supplied in a small current or may be supplied in a large current depending on the magnitude of the terminal voltage of the secondary battery 81, and to control charging current based on this, in order to prevent the degradation of the secondary battery 81. The logic part 21 may also perform such charging control of charging current. For example, if the terminal voltage of the secondary battery 81 is lower than a predetermined voltage, it is necessary to perform charging by having the charging current controlled to a small current. On the other hand, if the terminal voltage of the secondary battery 81 is over the predetermined voltage, charging may be performed with a large current. Accordingly, the control part 20 performs two-stage constant current charging control where charging is performed with a predetermined low current or a predetermined high current depending on the terminal voltage of the secondary battery 81. This makes it possible to control charging current suitably in accordance with the terminal voltage of the secondary battery 81, and to prevent the degradation of the secondary battery 81. Performing such control of charging current based on the battery voltage in the logic circuit 21 makes it possible to perform suitable control that takes both temperature and battery voltage of the secondary battery 81 into consideration.

The two-stage constant current control may be performed by outputting an instruction signal that corresponds to a predetermined two-stage constant current to the output control part 22.

Further, the logic part 21 may be configured to perform constant voltage control based on the battery voltage. As described above, if the secondary battery 81 is higher than a predetermined voltage, constant current charging control with high current is performed. However, if the secondary battery 81 is nearly fully charged to exceed a predetermined voltage near a full charge, it is preferable to switch from constant current charging control to constant voltage charging control. This constant voltage control can be performed if the battery voltage detection part 30 sets such a predetermined voltage near a full charge as a threshold voltage and outputs a corresponding battery voltage signal in response to the threshold voltage being exceeded and the logic part 21 includes a logic circuit that performs switching to constant voltage control in response to the outputting of the battery voltage signal.

An overheating protection part 40, which is a circuit part to output a signal to stop the outputting of charging current to the logic part 21 if the charging control circuit 50 or the charging controller 100 itself increases in temperature to be in an overheated state of a certain temperature or higher, may be provided for safety.

Next, a description is given of a method of setting four reference temperatures implemented in the temperature comparison part 10 in the charging control circuit 50 having such a configuration and the charging controller 100 using the same.

Figure 2:
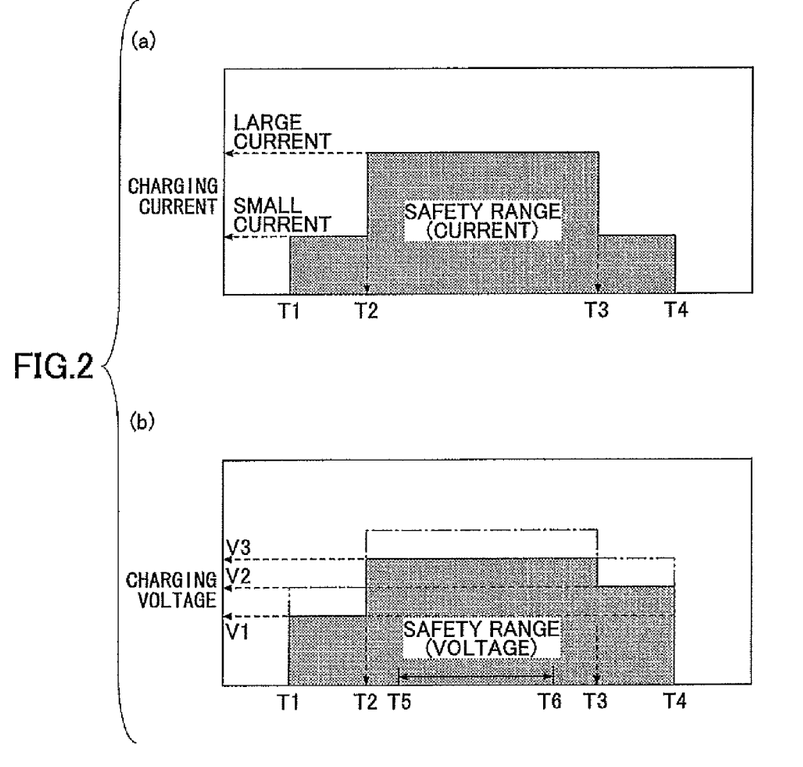
FIG. 2 is a diagram illustrating the relationship between battery temperature and the safety ranges of charging voltage and charging current.

FIG. 2 is a diagram illustrating the relationship between battery temperature and the safety ranges of charging voltage and charging current. FIG. 2(a) is a diagram illustrating the relationship between battery temperature and charging current, where the horizontal axis indicates battery temperature and the vertical axis indicates charging current.

In FIG. 2(a), four reference temperatures T1 through T4 are shown. The temperature range T1-T4 is a temperature range where charging may be performed. The temperature range T1-T2 represents a low temperature range, the temperature range T2-T3 represents a standard temperature range, and the temperature range T3-T4 represents a high temperature range.

In the standard temperature range T2-T3, the secondary battery 81 is in a safety range in terms of a temperature condition, so that the charging current may be a large current. On the other hand, in the low temperature range T1-T2 and the high temperature range T3-T4, which are not safety ranges, the charging current is a small current. Further, in the temperature range lower than the lower limit T1 of the low temperature range T1-T2 and the temperature range higher than the higher limit T4 of the high temperature range T3-T4, which are not chargeable ranges, the charging current is zero.

Thus, with the setup where four reference temperatures are provided, it is possible to extend the service life of the secondary battery 81 in view of the characteristics and safety of the secondary battery 81 and also to perform fine charging control with high charging efficiency.

FIG. 2(b) is a diagram illustrating the relationship between battery temperature and charging voltage, where the horizontal axis indicates battery temperature and the vertical axis indicates charging voltage. In FIG. 2(b) a recommended temperature range T5-T6 is further shown in the standard temperature range T2-T3.

In FIG. 2(b) also, charging is performed with the highest charging voltage V3 in the standard temperature range T2-T3, which is a safety range, charging is performed with a lower charging voltage V2 in the high temperature range T3-T4, and charging is performed with a yet lower charging voltage V1 in the low temperature range T1-T2. Further, charging is performed in neither of the temperature range lower than the lower limit T1 of the low temperature range and the temperature range higher than the upper limit T4 of the high temperature range, which are outside the chargeable temperature range.

In the recommended temperature range T5-T6, no charging voltage different from that in the peripheral portion of the standard range T2-T3 is set in particular. However, a finer setting of reference temperatures and their corresponding threshold voltages may be provided as required, and a higher charging voltage may be set for the recommended temperature range T5-T6. Implementation of optimum charging voltage control according to the characteristics of the secondary battery 81 can be expected.

Thus, with respect to charging voltage as well, setting four or more reference temperatures according to temperature ranges makes it possible to perform charging control in full consideration of the safety of the secondary battery 81.

Next, a description is given of a specific example of charging control by the charging control circuit 50 and the charging controller 100 using the same according to this embodiment.

Figure 3:
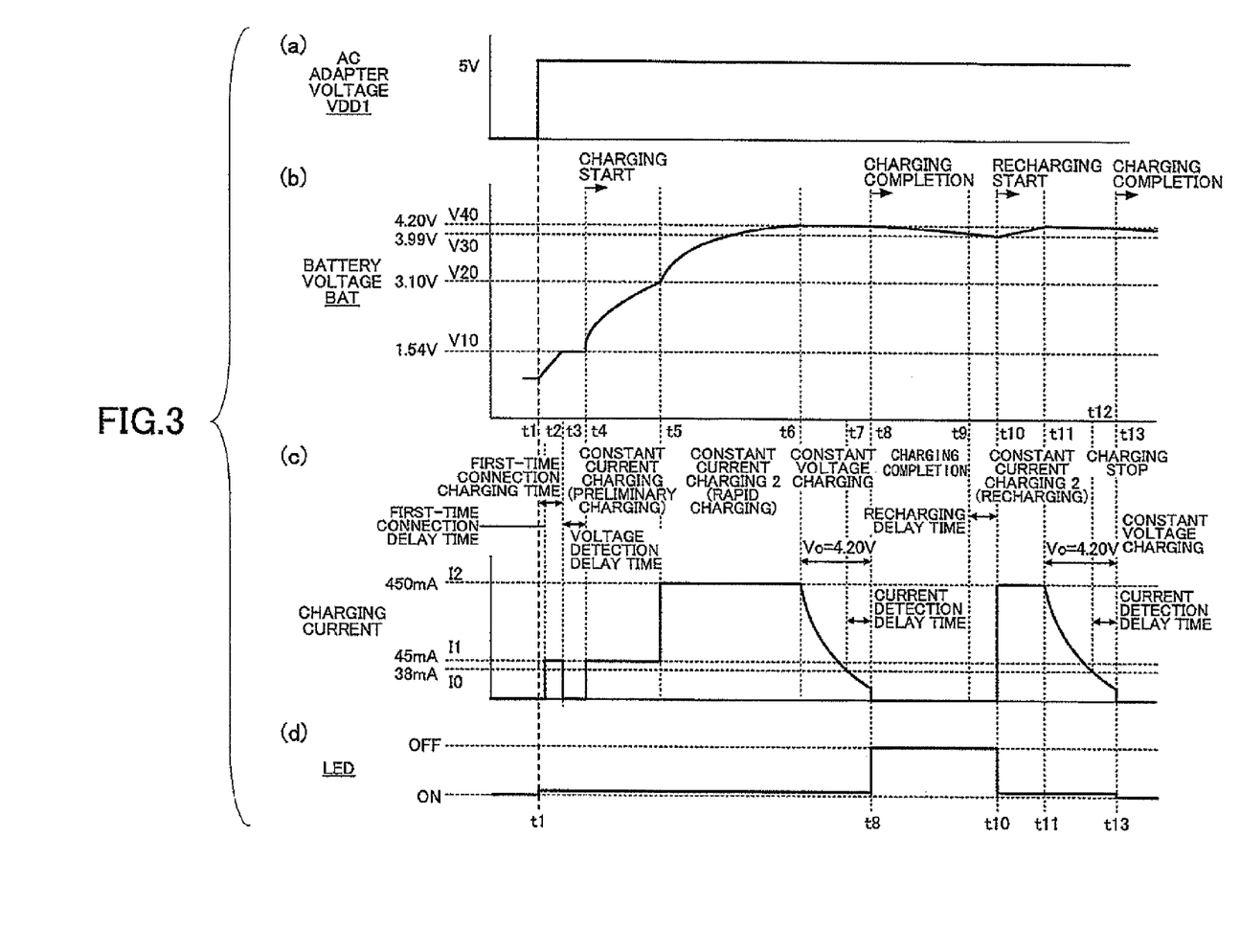
FIG. 3 is a timing chart illustrating changes in each current and each voltage of constant current control and constant voltage control based on battery voltage.

First, for the facilitation of understanding, a description is given of an example of the conventionally performed control based on the battery voltage of the secondary battery 81. FIG. 3 is a timing chart illustrating changes in each current and each voltage of constant current control and constant voltage control based on the battery voltage. FIG. 3(a) is a diagram illustrating changes over time in the AC adapter supply voltage supplied from the VDD1 terminal. FIG. 3(b) is a diagram illustrating changes over time in the voltage of the secondary battery 81. FIG. 3(c) is a diagram illustrating changes over time in charging current. FIG. 3(d) is a diagram illustrating changes over time in the lighting pattern of an LED. All horizontal axes indicate time.

In FIG. 3, at Time t1, an AC adapter voltage of 5 V is supplied from the terminal VDD1. At this point, the battery voltage detected from the BAT terminal by the battery voltage detection part 30 is less than or equal to a threshold voltage V10=1.54 V, where charging may be performed with a small current I1. At a first-time connection, a charging current of 45 mA, which is the set value of the small current I1, is caused to flow at Time t2 after passage of a first-time connection delay time. At this point, the LED is turned ON to light, and indicates that charging is being performed.

Thereafter, at Time t3, the battery voltage increases to the threshold voltage V10=1.54 V, at which charging may be performed with the small current I1, and after passage of a voltage detection delay time, the small current I1 of 45 mA is caused to flow at Time t4. Then, the battery voltage continues to rise to reach a threshold voltage V20=3.10 V, at which charging may be performed with a large current I2, at Time t5. At this point, the charging current is switched to the large current I2=450 mA at the same time at Time t5. This switching control is performed in the logic part 21 of the control part 20, and the outputting of a large current is performed in the output control part 22.

Thereafter, the battery voltage continues to rise to reach V40=4.20 V, which is the upper limit voltage of a full charge, at Time t6. At this point, the charging control is switched to constant voltage control, and such constant voltage control as to maintain V40=4.20 V is performed. Further, the charging current gradually decreases from the large current I2=450 mA to become lower than I0=38 mA, which is a threshold for a charging end, at Time t7. After passage of a predetermined current detection delay time since the charging current has become less than or equal to the charging end threshold I0, charging is completed at Time t8. Thus, control may be performed in such a manner as to end charging at last after passage of a predetermined time since the charging current becomes less than or equal to a predetermined threshold. In such control, after switching to constant voltage control, the charging current may be detected in the output control part 22 to be input to the logic part 21 so that the logic part 21 outputs a control instruction.

When charging is completed at Time t8, the feeding of charging current is stopped, and the LED is turned OFF to go out so as to indicate that no charging is being performed, while the battery voltage detection part 30 continues monitoring the battery voltage. When the battery voltage decreases to be lower than or equal to a threshold V30=3.99 V for a recharging start at Time t9, recharging is started after a predetermined recharging delay at Time t10. In this case, it is natural for the battery voltage to be higher than or equal to the threshold V20=3.10 V, at which a large current may be supplied. Therefore, recharging may be performed with the large current I2. Further, the LED is turned ON to light so as to indicate that charging is being performed.

Charging with a large current is restarted at Time t10, and the battery voltage reaches the threshold voltage V40=4.20 V, which is the upper limit of a full charge, at Time t11. Thereafter, charging current decreases. The charging current at this point is monitored by the output control part 22. When a predetermined current detection delay time passes after the charging current becomes lower than or equal to I0=38 mA at Time t12, which is the charging end threshold, charging is completed and the feeding of charging current is also stopped at Time t13. The timing chart of FIG. 3 ends here, but the same control may be repeated hereafter.

Thus, the charging control circuit 50 and the charging controller 100 according to this embodiment may be configured to enable constant current control and/or constant voltage control based on the battery voltage of the secondary battery 81. This configuration makes it possible to perform safer and more suitable charging control by combining charging control based on the battery voltage of the secondary battery 81 and charging control based on the temperature of the secondary battery 81.

Figure 4:
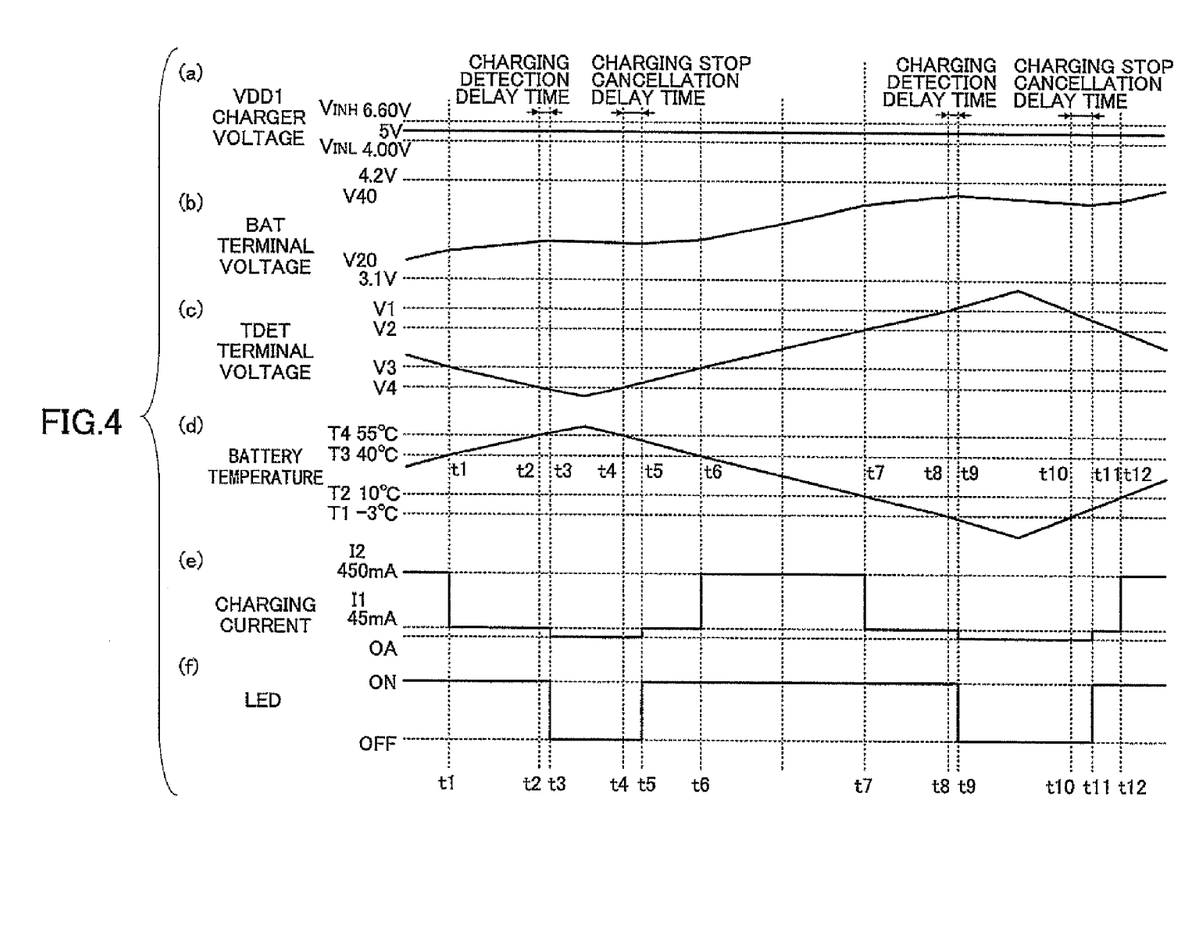
FIG. 4 is a timing chart illustrating an example of charging control based on the battery temperature of the secondary battery 81.

Next, a description is given, using FIG. 4, of an example of the charging control based on the battery temperature executed by the charging control circuit 50 and the charging controller 100 using the same according to this embodiment.

FIG. 4 is a timing chart illustrating an example of charging control based on the battery temperature of the secondary battery 81. FIG. 4(a) is a diagram illustrating changes over time in the charger voltage input to the VDD1 terminal. FIG. 4(b) is a diagram illustrating changes over time in the battery voltage detected from the BAT terminal. FIG. 4(c) is a diagram illustrating, changes over time in the terminal voltage of the temperature detection terminal TDET. FIG. 4(d) is a diagram illustrating changes over time in the battery temperature. FIG. 4(e) is a diagram illustrating changes over time in charging current. FIG. 4(f) is a diagram illustrating changes over time in the lighting pattern of an LED. All the horizontal axes of (a) through (f) of FIG. 4 indicate time.

FIG. 4(d) is a timing chart based on the detected voltage detected at the temperature detection terminal TDET, where the detected voltage detected at the temperature detection terminal TDET is converted to battery temperature. Therefore, FIG. 4(d) is inversely related to the voltage changes of FIG. 4(c). That is, the battery temperature decreases as the detected voltage input to the temperature detection terminal TDET increases, and the battery temperature increases as the detected voltage decreases. Therefore, the lowest reference temperature T1 of the battery temperature corresponds to the highest threshold voltage V1 of the detected voltage at the temperature detection terminal TDET, and the highest reference temperature T4 of the battery temperature corresponds to the lowest threshold voltage V4 of the detected voltage at the temperature detection terminal TDET. Likewise, the second lowest reference temperature T2 of the battery temperature corresponds to the second highest threshold voltage V2 of the detected voltage at the temperature detection terminal TDET, and the second highest reference temperature T3 of the battery temperature corresponds to the second lowest threshold voltage V3 of the detected voltage at the temperature detection terminal TDET. Based on this relationship, a description is given below of the contents of charging control on the basis of not the detected voltage at the temperature detection terminal TDET but the battery temperature for the facilitation of understanding and explanation. Needless to say, however, the explanation of the contents can be the same even if expressed with the battery voltage.

In FIG. 4, when the battery temperature is initially within the standard temperature range T2-T3, charging current is supplied in the large current I2=450 mA. Further, a stable charger voltage of 5 V is supplied at the VDD1 terminal from the beginning, and the battery voltage at the BAT terminal indicates a voltage higher than or equal to V20=3.1 V, which is a threshold for allowing small current feeding in the battery voltage-based control described in FIG. 3. At this point, the LED is ON, being lit to indicate that charging is being performed.

When the battery temperature enters the high temperature range T3-T4 at Time t1 after passage of time, charging current switches to the feeding of the small current I1=45 mA. Such switching control may be executed by the logic part 21 giving an instruction for switching based on the outputs of the comparators 11 through 14 of the temperature comparison part 10 and the output control part 22 supplying a small current.

When the battery temperature continues to increase to exceed the chargeable temperature range at Time t2, the feeding of charging current is stopped at Time t3 after passage of a predetermined charging stop detection time. Further, the LED is turned OFF to go out so as to indicate that no charging is being performed. At this point, the battery voltage at the BAT terminal is within a range where charging may be performed with the small current I1. However, the battery temperature condition does not meet a condition for allowing charging. Accordingly, charging is stopped. Thus, even if the battery voltage is within a range where charging may be performable, charging is stopped in light of safety if the battery temperature does not satisfy a temperature condition. Thus, giving priority to control based on battery temperature, which is related to safety, over control based on battery voltage makes it possible to increase safety at the time of charging and to ensure a longer service life of the secondary battery 81.

Next, the battery temperature falls again to enter the high temperature range T3-T4 at Time t4. Then, after passage of a predetermined charging stop cancellation delay time, charging is restarted at Time t5 to feed charging current in the small current I1. At the same time, the LED is turned ON to light so as to indicate that charging is being performed. Thus, according to the charging control circuit 50 and the charging controller 100 of this embodiment, when the battery temperature is in the high temperature range T3-T4, charging is performed with the small current I1 even if the battery temperature has entered a temperature range where charging may be performed. This makes it possible to perform fine and careful charging control and to perform suitable charging control that improves safety and extends the service life of the secondary battery 81.

When the battery temperature continues to fall to enter the standard temperature range T2-T3 at Time t6, charging current control with the large current I2 is started. This makes it possible to perform charging with the large current I2 if the secondary battery 81 is in a good temperature condition, thus making it possible to increase charging efficiency with safety in mind.

When the battery temperature continues to fall, and the battery temperature enters the low temperature range T1-T2 at Time t7, control is performed to switch charging current to the small current I1. Like the high temperature range T3-T4, the low temperature range T1-T2 is a temperature range where charging current is supplied in the small current I1. Therefore, charging current is switched to the small current I1 and supplied. This makes it possible to increase the safety of charging in the low temperature range T1-T2 as well.

The battery temperature continues to fall to become lower than or equal to the lower limit temperature T1 of the low temperature range T1-T2 at Time t8. Then, after passage of a predetermined charging stop detection delay time, the feeding of charging current is stopped and the LED is turned OFF to go out at Time t9. Since the battery temperature is below the chargeable temperature range, charging is stopped to perform control to protect the secondary battery 81.

The battery temperature rises to enter the low temperature range T1-T2 at Time t10. Then, after passage of a predetermined charging stop cancellation delay time, the feeding of charging current is started and the LED is lit at Time t11. Since the battery temperature at this point is in the low temperature range T1-T2, charging current is supplied in the small current I1.

When the battery temperature continues to rise to enter the standard temperature range at Time t12, the charging current supplied is switched to the large current I2, and rapid charging is performed.

Thus, according to the charging control circuit 50 and the charging controller 100 of this embodiment, the four reference temperatures T1 through T4 and their corresponding four threshold voltages V1 through V4 are set, and the contents of control are switched based on which temperature range the detected battery temperature is in, so that it is possible to perform fine control in view of battery safety.

Further, by performing charging control combined also with the battery voltage-based control described in FIG. 3, it is possible to perform finer control with high safety and charging efficiency. In this embodiment, the values of the large current I2 and the small current I1 are common to the constant current control based on battery voltage and the constant current control based on battery temperature. Therefore, even in the case of combining the charging control based on battery voltage and the charging control based on battery temperature, it is only necessary to control output switching inside the logic part 21 for the output of constant current control. Accordingly, it is possible to simplify a logic circuit configuration.

In FIG. 3 and FIG. 4, a description is given, taking specific current values and voltage values as examples. However, those are mere examples, and, needless to say, various settings are possible in accordance with purposes. In this embodiment, a description is given of the case of setting four reference temperatures and their corresponding four threshold voltages, while more reference temperatures and threshold voltages may be set to perform finer charging control. Further, in this embodiment, the small current I1 of the same value is used when the battery temperature is in the low temperature range T1-T2 and in the high temperature range T3-T4. However, the value of the small current I1 may differ between the low temperature range T1-T2 and the high temperature range T3-T4 depending on battery characteristics. As a result, finer and more suitable control in accordance with the characteristics of the secondary battery 81 can be expected.

A detailed description is given above of a preferred embodiment of the present invention. The present invention, however, is not limited to the above-described embodiment, and various variations and replacements may be added to the above-described embodiment without departing from the scope of the present invention.

The present international application claims priority based on Japanese Laid-Open Patent Application No. 2007-177465, filed on Jul. 5, 2007, the entire contents of which are incorporated herein by reference.

The invention claimed is:

1. A semiconductor integrated circuit device comprising:
a charging control circuit configured to control charging of a secondary battery, wherein the charging control circuit includes
a temperature comparison part configured to output a temperature range signal corresponding to a detected voltage from a temperature sensor configured to detect a battery temperature of the secondary battery,
a control part configured to perform both controls of a battery temperature charging control for controlling a charging current and a charging voltage based on the temperature range signal, and a battery voltage charging control for controlling at least a constant current charge and a constant voltage charge based on a battery voltage of the secondary battery, and a regulator configured to serve as a voltage source in the temperature comparison part; and a package including
- a supply terminal to which a supply voltage fed to the charging control circuit is input,
- a battery terminal configured to supply the charging current and the charging voltage output from the control part to the secondary battery and to which the battery voltage of the secondary battery is input,
- a temperature detection terminal to which the detected voltage from the temperature sensor is input and configured to supply the detected voltage to the temperature comparison part, and
- a reference voltage terminal configured to output a voltage from the regulator to an outside of the semiconductor integrated circuit device as a reference voltage,
- wherein the temperature detection terminal and the reference voltage terminal are external connection terminals of the semiconductor integrated circuit device and are provided separately from each other,
- the reference voltage terminal is connected directly to the regulator to constantly output the reference voltage, and
- the reference voltage terminal is configured to be connected to the temperature detection terminal via a resistor provided outside the semiconductor integrated circuit device.

2. The semiconductor integrated circuit device as claimed in claim 1,
wherein the control part includes a logic part including a logic circuit, and an output control part configured to output the charging current based on an output instruction signal from the logic part.

3. The semiconductor integrated circuit device as claimed in claim 2,
wherein the control part performs an overheat protection control to control the charging current when a temperature of the charging control circuit is in an overheated state of a certain temperature or higher.

4. An electronic apparatus comprising:
a mounting portion configured to allow a semiconductor integrated circuit device to be mounted thereon; and
a semiconductor integrated circuit device as claimed in claim 1 mounted on the mounting portion.

5. A charging controller comprising:
a charging control circuit configured to control charging of a secondary battery, wherein the charging control circuit includes a temperature comparison part including a regulator configured to generate a reference voltage for setting a plurality of threshold voltages, and a plurality of comparators configured to generate a temperature range signal by comparing a detected voltage from a temperature sensor configured to detect a battery temperature of the secondary battery with the plurality of threshold voltages, a control part configured to perform both controls of a battery temperature charging control for controlling a charging current and a charging voltage based on the temperature range signal, and a battery voltage charging control for controlling at least a constant current charge and a constant voltage charge based on a battery voltage of the secondary battery, and an overheating protection part configured to perform an overheat protection control for controlling the charging current when a temperature of the charging control circuit is in an overheated state of a certain temperature or more; and a package including
- a supply terminal to which a supply voltage fed to the charging control circuit is input,
- a battery terminal configured to supply the charging current and the charging voltage output from the control part to the secondary battery and to which the battery voltage of the secondary battery is input,
- a temperature detection terminal to which the detected voltage from the temperature sensor is input and configured to supply the detected voltage to the temperature comparison part, and
- a reference voltage terminal configured to output the reference voltage from the regulator, wherein the charging control circuit and the package are configured to be a semiconductor integrated circuit device, the temperature detection terminal and the reference voltage terminal are external connection terminals of the semiconductor integrated circuit device and are provided separately from each other, the reference voltage terminal is connected directly to the regulator to constantly output the reference voltage to an outside of the semiconductor integrated circuit device, and the reference voltage terminal is configured to be connected to the temperature detection terminal via a resistor provided outside the semiconductor integrated circuit device.

* * * * *